Oct. 14, 1958     A. R. STOBB     2,855,996
CONVEYOR FOR FLEXIBLE SHEETS
Filed March 16, 1955     4 Sheets-Sheet 1

INVENTOR:
ANTON R. STOBB
BY: *ATTORNEY*

Oct. 14, 1958

A. R. STOBB 2,855,996

CONVEYOR FOR FLEXIBLE SHEETS

Filed March 16, 1955

INVENTOR:
ANTON R. STOBB
BY: *Arthur J. Hansmann*
ATTORNEY

Oct. 14, 1958

A. R. STOBB 2,855,996

CONVEYOR FOR FLEXIBLE SHEETS

Filed March 16, 1955

INVENTOR:
ANTON R. STOBB
BY: *Arthur J. Hansmann*
ATTORNEY

Oct. 14, 1958 A. R. STOBB 2,855,996
CONVEYOR FOR FLEXIBLE SHEETS
Filed March 16, 1955 4 Sheets-Sheet 4

INVENTOR:
ANTON R. STOBB
BY: Arthur J. Hansmann
ATTORNEY

United States Patent Office 2,855,996
Patented Oct. 14, 1958

2,855,996
CONVEYOR FOR FLEXIBLE SHEETS

Anton R. Stobb, Racine, Wis., assignor to Western Printing & Lithographing Co., Racine, Wis., a corporation of Wisconsin Application March 16, 1955, Serial No. 494,790

9 Claims. (Cl. 164—68)

This invention relates to the handling of flexible sheets, and, particularly, it relates to a conveyor for flexible sheets such as paper, wherein the sheets are conveyed at a high speed.

This invention is particularly useful in connection with the conveyance of paper which has been printed in a web form. Since the development of high speed printing presses for printing webs of paper, a problem exists in connection with the handling of the printed web. In cutting the web and conveying and stacking the cut sheets coming off the press, presently known machinery is not capable of handling the printed web at a speed to keep up with the high speed of the press. Therefore, it has become a practice to slow the printing presses to a speed to permit the conveyor unit to handle the printed web. This practice is, of course, undesirable in that the high speed otherwise attainable has not been accomplished heretofore.

It is, therefore, an object of this invention to provide a conveyor for flexible sheets wherein the sheets can be conveyed at a high speed.

It is another object of this invention to provide a conveyor for flexible sheets wherein the sheets are received at a high speed and stacked at a lower speed which is more suitable for stacking.

It is still another object of this invention to provide a conveyor for flexible sheets wherein a web of paper or the like is continuously moved through said conveyor at a high speed and is cut and stacked by said conveyor.

Another object of this invention is to provide a high speed conveyor for flexible sheets wherein the sheets can be stacked into uniform piles which are ready for bundling or the like.

Other objects and advantages will become more readily apparent upon reading the following description in conjunction with the accompanying drawings, wherein.

Similar reference numerals refer to similar parts throughout the several views.

Figure 1:
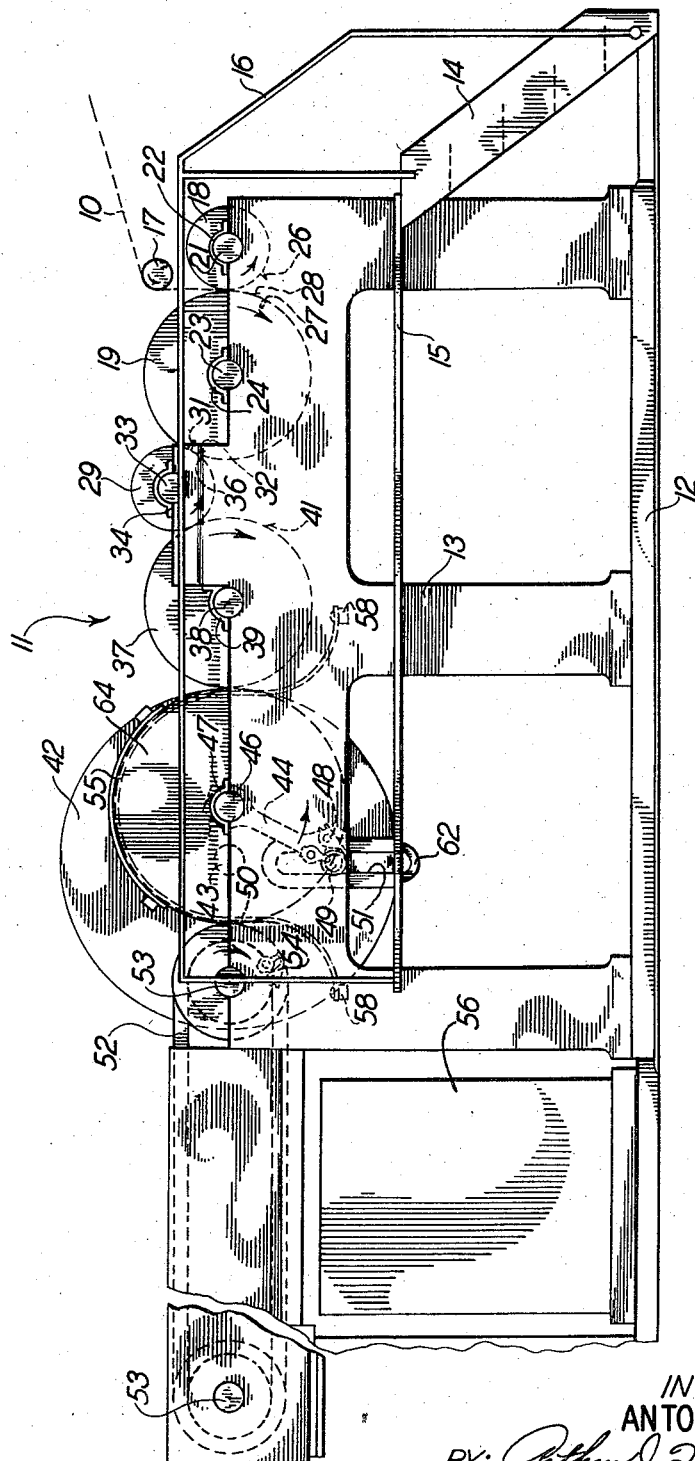
Fig. 1 is a side elevational diagrammatic view of a preferred embodiment of this invention.

As shown in Fig. 1, the dotted line 10 represents a web of paper or the like which, it may be assumed, has passed through a printing press (not shown) and is being fed into a conveyor 11 of this invention. The conveyor 11 represents one embodiment of this invention and is shown to consist of a base 12 which may be positioned upon a floor to support frame side pieces, such as that shown side 13. In this embodiment a platform 15 extends through the length of the conveyor with a set of steps 14 and a hand rail 16 attached thereto, all for the purpose of permitting an operator to have convenient access to the conveyor.

With this arrangement, the paper 10 is threaded through the conveyor 11 in the manner hereinafter described. Initially, the paper is positioned over a guide roll 17 to be directed between a cutting cylinder 18 and a cooperating delivery cylinder 19. It should be noted that the cylinder 18 contains a shaft 21 suitably supported on the frame 13 with the shaft secured thereto by a bracket 22. Also, the cylinder 19 contains a shaft 23 which is likewise suitably supported on the frame 13 and secured thereto by a bracket 24. Thus, the cylinders 18 and 19 are mounted for rotation in the direction of the arrows on the cylinders so that the cylinders are essentially in rolling contact, and the paper 10 is fed therebetween. Further, the cylinder 18 is shown to be one-half the diameter of the cylinder 19 and it should be understood that the cylinders rotate in synchronization. The cylinder 18 contains a knife 26 projecting from the circumference of the cylinder, and the cylinder 19 correspondingly contains a knife slot 27 which receives the knife 26 at the point of rotation between the cylinders where the knife 26 and the slot 27 are mated. Also, a set of paper gripper pins are provided on the cylinder 19 immediately behind the slot 27 to form a row of pins along the cylinder in a line indicated by the pins 28. The pins 28 then hold the paper across its width after it is cut by the knife 26. Each rotation of the cylinder 18 cuts the paper 10 into a length corresponding to the circumference of the cylinder 18. Of course, the pins 28 then carry each cut sheet of paper around the cylinder 19 to a diametrically opposite point to communicate with a collecting cylinder 29. It should be noted that the cylinder 19 also contains a second knife slot 31 and a second set of gripper pins 32 with both the slot and the pins acting in the same manner as mentioned in connection with the slot 27 and the pins 28. Since cylinders having knives, slots, and pins for the purposes mentioned above are conventional, no further showing or description of the parts described is deemed to be necessary for an understanding of this invention. Also, it should be understood that the pins are usually cam operated to project from the circumference of the cylinder when receiving a sheet, such as the pins 28 are shown, while the pins are retracted into the cylinder when delivering a sheet, such as the pins 32 are shown.

The cylinder 29 contains a shaft 33 which is also rotatably mounted on the frame 13 and is secured thereto by a bracket 34. The cylinder is rotatable in the direction shown by the arrow on the cylinder. The latter also contains a set of gripper pins indicated at 36, which project from the periphery of the cylinder to co-operate with pins 28 and 32 of the cylinder 19 and receive the sheets of paper from the pins of the cylinder 19. It should be noted that the cylinder 29 is one-half the diameter of the cylinder 19 and here also the cylinders are essentially in rolling contact.

A transfer cylinder 37 is suitably rotatably mounted in the frame 13 on a shaft 38 and is secured to the frame by a bracket 39 to be rotatable in the direction of the arrow on the cylinder. The cylinder 37 is thus positioned essentially in rolling contact with the cylinder 29, and it is twice the diameter of the cylinder 29. The cylinder 37 is also provided with a set of gripper pins 41 which co-operate with the pins 36 of the cylinder 29 to receive the paper from the cylinder 29 in a manner described later.

A drive member or gear 42 is rotatably mounted on a shaft 43 to be offset, in a manner described later, from the cylinders mentioned above with the member 42 twice the diameter of the cylinder 37. Also, as more fully described later, a gripper arm or carrier 44 is rotatably mounted in the frame 13 on a shaft 46 and is secured to the frame by a bracket 47. The arm or carrier 44 contains a gripper 48 at the outer end of the arm with the gripper and the arm disposed in alignment with the cylinders mentioned above. The arm thus rotates in the direction shown by the arrow and is essentially in rolling contact with the cylinder 37 since the circular path scribed by the arm is approximately tangential to the circumference of the cylinder 37. Also, as described later, the arm 44 is in rotatable relation with the member 42 by means of a roller 49 attached to the outer end of the arm 44 with the roller engaged in a slot 51 which is radially disposed in the member 42. Thus, with rotation of the member 42 about its shaft 43, the arm 44 is rotated about its shaft 46 which is eccentric to the shaft 43. The rotation of the member 42 is synchronized with the rotation of the cylinders previously mentioned and is also of a uniform speed of rotation. However, since the arm 44 is driven by and is eccentric to the member 42, the arm rotates at an irregular speed with the fastest speed of rotation occurring when the roller 49 is the greatest distance from the shaft 43, and that is at the point where the roller 49 is at its closest position to the cylinder 37. Conversely, the slowest speed of rotation of the arm 44 occurs when the roller 49 is closest to the shaft 43 and that is when the roller is in a position diametrically opposite from the cylinder 37 on the circular path of the roller movement. As will be more apparent later, a pair of arms 44 is preferably provided to support a plurality of grippers 48 in line with the arms to operate in spaced positions across the sheet conveyed. This spacing is similar to that of the pins and is arranged so the pins and the grippers are alternately disposed to engage the paper at different points across its width.

Suitably mounted adjacent the circular path of movement of the gripper 48 is a sheet conveyor 52 which is shown horizontally disposed between two rotatably mounted shafts 53 located at opposite ends of the conveyor. The conveyor thus moves in the direction indicated by the arrow shown thereon and it contains a gripper 54 for flexible sheets. As more fully apparent later, the gripper 54 receives a plurality of cut sheets of paper from the arm 44 and conveys the paper to a suitable stacking location such as indicated by the pile 56. The conveyor is shown fragmentarily, but it should be understood that the conveyor could be made in numerous lengths and with a plurality of grippers 54. Also, several piles, such as pile 56, could be formed in different locations, as desired. In receiving the paper from the gripper 48, the conveyor moves at a speed corresponding to the speed of the gripper 48 at the time the latter is adjacent to the conveyor and that is the slowest speed of the gripper 48, as mentioned above. Since the grippers 48 and 54 are alternately spaced to permit overlapping positioning between both the rows of grippers, the grippers 54 are aligned with the pins 41 to grip the paper where the pins had punched the paper. Thus, those punch points are pressed out of the paper. Also, grippers 48 press the punches formed in the paper by the pins 36. The grippers 48 and 54 are spaced similar to the spacing of the pins between two cooperating cylinders described.

With the conveyor 11, as mentioned above, the paper 10 is guided between the cylinders 18 and 19 and is cut into lengths corresponding to one-half the circumference of the cylinder 19 as the knife 26 cooperates with the slots 27 and 31, and the pins 28 and 32 carry the cut sheets to the collecting cylinder 29. The latter, of course, rotates twice with each revolution of the cylinder 19, and, therefore, its pins 36 collect four sheets from the cylinder 19 with every two revolutions of the latter. After four sheets are collected on the cylinder 29, the pins 41 on the cylinder 37 receive the four sheets from the cylinder 29 since the cylinder 37 is twice the diameter of the cylinder 29 and the pins 41 operate with every other revolution of the cylinder 37 to collect the four sheets from the cylinder 29. The four sheets held by the pins 41 are then transferred to the gripper 48 of the arm 44 with the latter moving at its high speed which is a speed corresponding to the peripheral speed of the cylinder 37. The arm 44 then rotates to the conveyor 52 to transfer the four sheets to the gripper 54 on the conveyor 52 with the transfer effected at a speed approximately one-third of the speed at which the arm received the papers from the cylinder 37. Thus, the arm 44 and the conveyor 52 are moving at the same peripheral speed at the time of the transfer of the papers to the conveyor 52. The papers are finally stacked into the stack 56 or the like. It should, of course, be understood that a different number of sheets, other than the four sheets mentioned, could be collected and conveyed as described. Also, the relative sizes of the cylinders could be varied for accommodation of the different speeds and numbers of sheets.

In the transfer of the paper between the cylinder 37 and the conveyor 52, the gripper 48, of course, attaches to the leading edge of the sheets being transferred, and it is preferred that a guide 50 be provided to guide the inner side of the sheets. Therefore, the guide 50 is shown curved to conform to the upper portion of the circular path of travel of the gripper 48 and to be disposed slightly radially inwardly from the gripping part of the gripper with the ends of the guide suitably attached to a member 58 to be stationary with the frame. An outer guide 55 is also suitably mounted in a stationary position to guide the outside of the sheets which are thus conveyed between the two guides 50 and 55. It will be obvious, of course, that any suitable manner of guiding the trailing end of the cut sheets through the transfer section mentioned will be satisfactory for the purpose of this invention.

Figure 3:
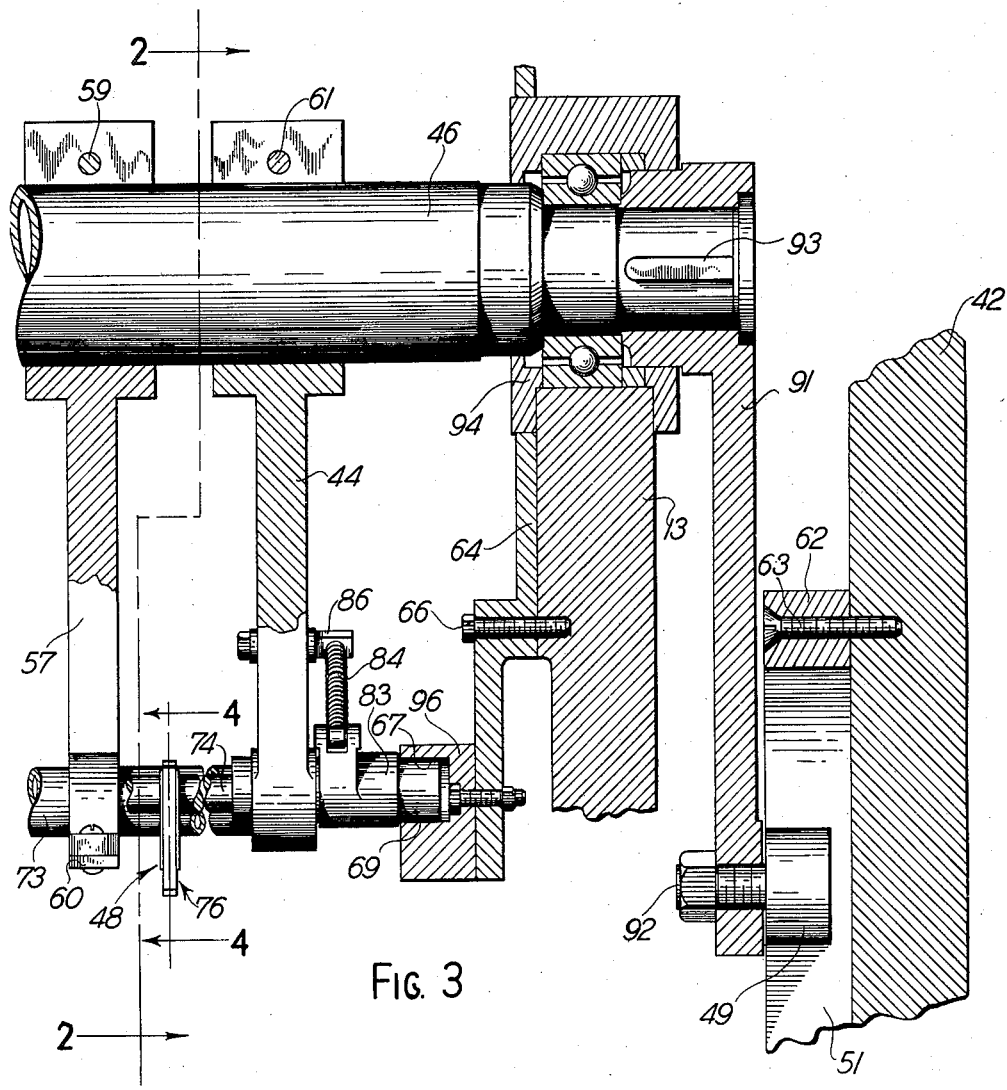
Fig. 3 is an enlarged sectional view taken substantially on the line 3—3 of Fig. 2, but with the gripper mechanism shown in full.

Fig. 3 shows the gripper 48 mounted, as more fully explained later, with one part on a shaft 73 which is also described later. The shaft 73 is supported eccentric to the shaft 46 through an arm 57 suitably clamped at one end to the shaft 46 by a bolt 59. The other end of the arm 57 is secured to the shaft 73 by a clamp 60. The arm 57 is, therefore, disposed aligned and similar to the arm 44. Of course, any other suitable manner of supporting the shaft 73 can be employed.

Figure 2:
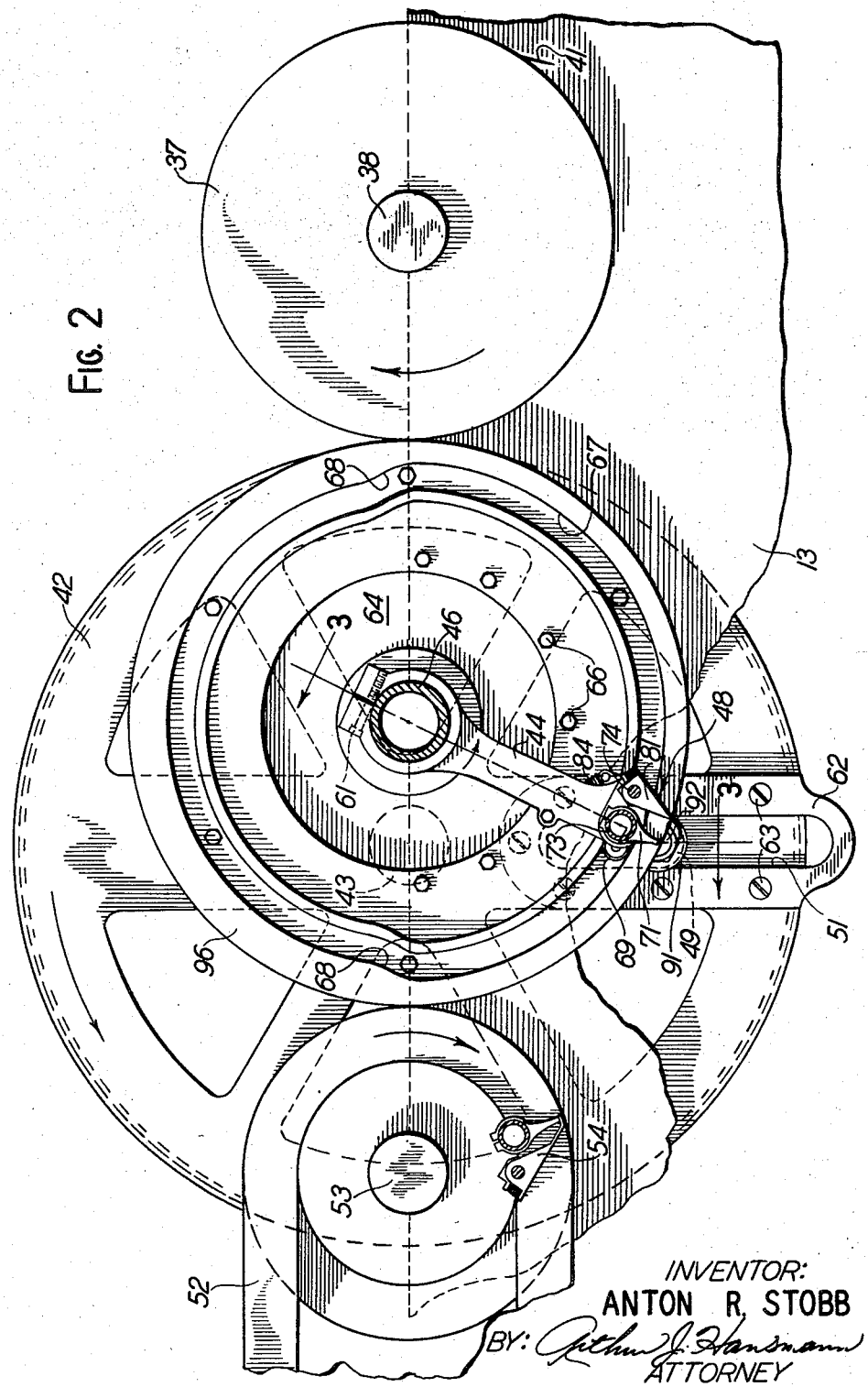
Fig. 2 is an enlarged sectional view of certain parts of the embodiment shown in Fig. 1, and taken on the line 2—2 of Fig. 3.

Figs. 2 through 5 show enlargements of the parts referred to in the foregoing description. Fig. 2 shows the section of the eccentric arm or carrier 44 non-rotatably attached to the shaft 46 by means of a clamping bolt 61. The radially outer end of the arm 44 is substantially aligned with the connector or roller 49 which is now shown to be received in the guide or slot 51 of a bracket 62 attached to the side of the drive member 42 by means of bolts 63. Also, a circular plate 64 is shown attached by bolts 66 to the frame 13 to present a cam groove 67 having irregular cam sections predeterminately located as in the two opposite sections 68 of the groove 67. A cam follower 69 is then disposed within the cam 67 to ride therewithin and actuate the gripper 48, as explained later. It will be noted that, as shown, the cam 67 is arranged to effect an open position of the gripper 48 through the lower half of the cam 67 while the upper half of the cam 67 will effect a closed position of the gripper, and it is through the upper half that the gripper 48 is carrying paper from the cylinder 37 to the conveyor or receiver 52.

Figure 4:
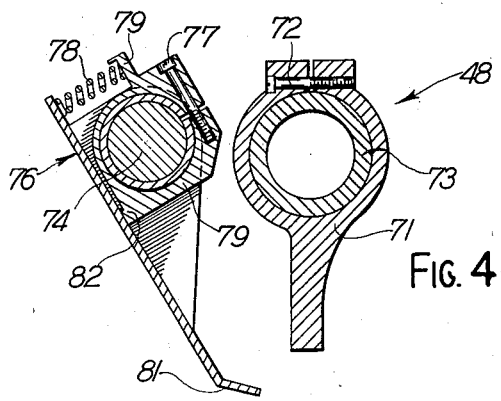
Fig. 4 is an enlarged sectional view taken on the line 4—4 of Fig. 3.
Figure 5:
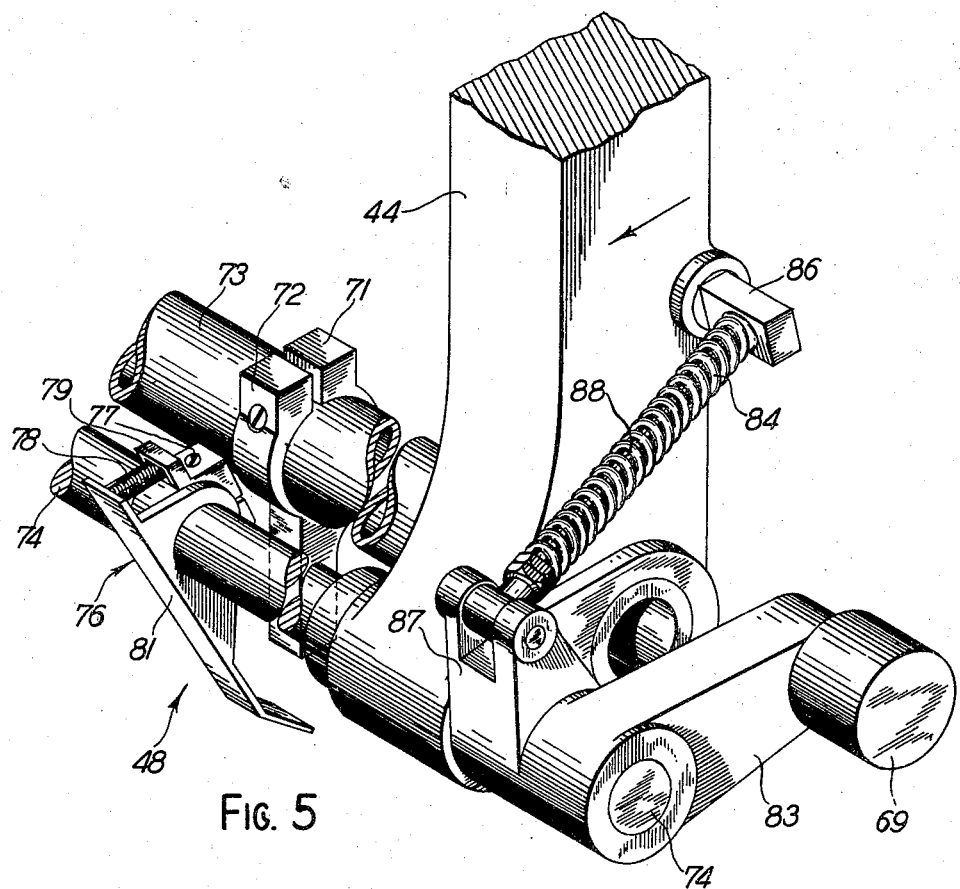
Fig. 5 is an enlarged right side perspective view of a fragment of the embodiment shown in Fig. 3.

The grippers used in this invention can be of any conventional design, and, in the embodiment shown, particularly in Figs. 4 and 5, the gripper 48 consists of a base section 71 which is suitably clamped by a bolt 72 to a shaft 73 extending the width of the conveyor 11 which corresponds to the width of the sheet of paper transferred. The shaft 73 is non-rotatably attached to the outer end of the arm 44 while the base 71 projects radially from the shaft 73 and is offset from the arm 44. A second shaft 74 is rotatably mounted in the extended end of the arm 44 to support a pivotal finger portion 76 of the gripper 48. With the finger 76 aligned with the gripper base 71, the finger 76 is non-rotatably clamped to the shaft 74 by bolt 77. In this embodiment, it is further preferred that the finger 76 be resiliently biased by a spring 78 attached between a base portion 79 and a paper clamping portion 81. Thus, the base 79 is fixedly clamped onto the shaft 74 while the portion 81 is rotatable on the shaft except as governed by the spring 78. Also, Fig. 4 shows the base portion 79 is preferably provided with a stop 82 which engages the portion 81 of the finger 76 to limit, in one direction, the rotation of the portion 81 with respect to the base portion 79.

The drawings show the gripper 48 to be in the open position since the finger 76 is rotated away from the radially outer end of the base 71. However, it should be obvious that counterclockwise rotation of the finger 76, as shown in Fig. 4, would move the portion 81 onto the base 71 and any paper placed between the latter two members would, of course, be held by the gripper until the gripper is again opened. In the embodiment shown, the means for opening and closing the gripper by rotation of the shaft 74 consist of the cam follower 69 non-rotatably attached through an offset arm 83 to the shaft 74. Thus, movement of the cam follower 69 about the axis of the shaft 74 will rotate the latter and thereby actuate the finger 76 to open and close the gripper. As mentioned, the cam follower 69 rides in the cam groove 67 upon rotation of the arm 44 about the shaft 46, and the cam follower will rotate about the shaft 74 when the follower passes through the two cam sections 68, and it is, of course, at these two points that the gripper is closed and opened.

Fig. 5, particularly, shows a compression spring 84 abutting at one end a trunnion 86, rotatably attached to the arm 44, with the opposite end of the spring rotatably attached to a projection 87 which is integral with the offset arm 83. It is also preferred that a center rod 88 be disposed within the spring 84 to support the latter and keep it aligned between the members 86 and 87. The spring 84 yieldingly biases the cam follower 69 to one side of the cam track 67 in order that the cam follower can more efficiently engage the cam 67. The arm 44 and the shafts 73 and 74 rotate in the direction of the arrow shown in Fig. 5.

The gripper 54 shown mounted on the conveyor 52 is constructed and operated similar to that of the gripper 48. It should, of course, be understood that other embodiments of grippers could be employed on the end of the carrier 44 as well as on the conveyor 52, and, therefore, the specific embodiment of the gripper shown and described is not indispensible to this invention. However, since the grippers 48 and 54 clamp the paper rather than punch it as the pins do, if grippers like grippers 48 and 54 are employed with the pins, the pin holes can be pressed out of the paper which will then stack more evenly.

Referring to Fig. 3, it will be seen that a fragment of the driving member 42 is shown with the attached grooved plate 62. It will be further noted that the roller 49, disposed within the groove 51, is attached to the end of an arm 91 by a bolt 92. The arm 91 is further shown to be non-rotatably affixed to the shaft 46 by means of a conventional keyway 93 so that rotation of the arm 91, as driven by the member 42 through the roller 49, is transmitted to the shaft 46. As further shown in Fig. 2, the arm 91 is radially disposed parallel to the arm 44. The shaft 46 is mounted in the main frame 13 with ball bearings 94 disposed between the frame and the shaft to permit suitable rotation of the shaft on the frame 13. The member 42 is thus the drive member while all the rotating parts on the shaft 46 constitute the driven member.

Fig. 3 also shows one manner of attaching the circular plate 64 to the frame 13 by the bolts 66, as previously mentioned. The plate 64 is further shown to support a cam section 96 which contains the cam groove 67.

The vertical and spaced apart frame sections 13 thus rotatably support the shaft 46 while a carrier or arm 44 is positioned at each end of the shaft 46. However, a plurality of grippers 48 may be employed along the shafts 73 and 74 to provide for gripping securely across the width of the sheet being conveyed.

While a specific embodiment of this invention has been shown and described, it will be obvious that certain changes could be made in this embodiment without departing from the invention and, therefore, the invention should be limited only by the scope of the appended claims.

I claim:

1. In a conveyor for receiving a web of paper, the combination comprising a series of rotatable cylinders positioned in essentially rolling contact for rotation at a common predetermined peripheral speed, said series including a first cylinder and a second cylinder of a selected diameter with said first cylinder and said second cylinder suitable for receiving said web of paper therebetween, a sheet cutting knife and slot combination on said first cylinder and said second cylinder for cutting said web into sheets of predetermined length upon rotation of said cylinders, a sheet collecting cylinder included in said series and being disposed in sheet receiving communication with said second cylinder and being of a diameter of an even fraction less than said selected diameter, a carrier rotatably mounted in sheet receiving communication with said collecting cylinder, sheet grippers respectively attached to said cylinders and to said carrier for progressively transferring said sheets to said carrier upon rotation of said cylinders and said carrier, said grippers on said collecting cylinder adapted to operate for receiving a plurality of said sheets before transferring said sheets to said carrier, means in driving relation with said carrier for rotating said carrier at said predetermined peripheral speed when receiving said sheets from said series of cylinders and thereafter rotating said carrier at a slower speed when said sheet grippers release said sheets, certain of said series of cylinders and said carrier mounted with the axes of rotation thereof parallel and on a common plane and the axis of said collecting cylinder being disposed offset from said plane to the side thereof to receive said sheets from said second cylinder at a position more than 180 degrees of rotation of said second cylinder from the position that said second cylinder received said sheets.

2. In a conveyor for receiving a web of paper, the combination comprising a series of rotatable cylinders, said series including a first cylinder and a second cylinder with the latter being a selected diameter, a sheet cutting knife and slot combination on said first cylinder and said second cylinder for cutting said web into sheets of a length one-half the circumference of said second cylinder upon rotation of said cylinders, a sheet collecting cylinder included in said series to be in sheet receiving communication with said second cylinder and being one-half the diameter of said second cylinder, a carrier rotatably mounted in sheet receiving communication with said collecting cylinder, sheet grippers respectively attached to said cylinders and said carrier, said grippers on said collecting cylinder adapted to be operated to receive a plurality of said sheets before transferring said sheets to said carrier, and means in driving relation with said carrier for rotating said carrier at a predetemined peripheral speed when receiving said sheets from said series of cylinders and thereafter rotating said carrier at a slower speed when said sheet grippers release said sheets.

3. In a conveyor for handling flexible sheets such as a web of paper moving at a continuous speed from a printing press, the combination comprising a series of rotatable cylinders, said series including a first cylinder and a second cylinder with the latter being a selected diameter, a sheet cutting knife and slot combination on said first cylinder and said second cylinder for cutting said web into sheets of a length one-half the circumference of said second cylinder upon rotation of said cylinders, a sheet collecting cylinder included in said series to be in sheet receiving communication with said second cylinder and being one-half the diameter of said second cylinder, a carrier rotatably mounted in sheet receiving communication with said collecting cylinder, sheet grippers respectively attached to said second cylinder and said collecting cylinder and to said carrier for progressively transferring said sheets to said carrier upon rotation of said cylinders and said carrier, said grippers on said collecting cylinder adapted to operate for receiving a plurality of said sheets before transferring said sheets to said carrier, means operatively associated with said carrier for rotating said carrier at a predetermined peripheral speed when receiving said sheets from said series of cylinders and thereafter rotating said carrier at a slower speed when said sheet grippers release said sheets, said collecting cylinder being disposed offset with respect to said first cylinder and said second cylinder to receive said sheets from said second cylinder after said second cylinder rotates more than one-half of a revolution in transferring said sheets to said collecting cylinder.

4. In a conveyor for receiving a web of paper moving at a continuous speed and cutting said web into separate sheets and piling said sheets, the combination comprising a series of rotatable cylinders, said series including a first cylinder and a second cylinder with the latter being a selected diameter, a sheet cutting knife and slot combination on said first cylinder and said second cylinder for cutting said web into sheets of a length one-half the circumference of said second cylinder upon rotation of said cylinders, a sheet collecting cylinder included in said series to be in sheet receiving communication with said second cylinder and being one-half the diameter of said second cylinder, a transfer cylinder included in said series and in sheet receiving communication with said collecting cylinder and being of the diameter of said second cylinder, a carrier rotatably mounted in sheet receiving communication with said transfer cylinder, sheet grippers respectively attached to said cylinders and to said carrier for progressively transferring said sheets to said carrier upon rotation of said cylinders and said carrier, said grippers on said collecting cylinder adapted to be operated to receive a plurality of said sheets before transferring said sheets to said transfer cylinder, said collecting cylinder and said transfer cylinder and said carrier and their respective grippers all disposed for transferring of said sheets to said carrier after said sheets are out of contact with said collecting cylinder, and means in driving relation with said carrier for rotating said carrier at a predetermined peripheral speed when receiving said sheets from said series of cylinders and thereafter rotating said carrier at a slower speed.

5. In a conveyor for receiving a web of paper moving at a continuous speed and cutting said web into separate sheets and piling said sheets, the combination comprising a series of rotatable cylinders with drive means for rotating said cylinders at a common predetermined peripheral speed corresponding to said continuous speed, said series including a first cylinder and a second cylinder with the latter being a selected diameter, a sheet cutting knife and slot combination on said first cylinder and said second cylinder for cutting said web into sheets of a length one-half the circumference of said second cylinder upon rotation of said cylinders, a sheet collecting cylinder in said series and in sheet receiving communication with said second cylinder, a sole set of arms rotatably mounted in sheet receiving communication with said series of rotatable cylinders, sheet grippers attached to said cylinders and said arms for progressively transferring said sheets to said arms upon rotation of said cylinders and said arms, said grippers on said collecting cylinder adapted to be operated to receive a plurality of said sheets before transferring said sheets to said arms, a sole receiver mounted in sheet transfer communication with said arms for receiving said sheets therefrom and moving at a slow speed less than said continuous speed and in the direction of movement of said arms therepast, and drive means associated with said arms for moving said arms at said continuous speed when said arms are receiving said sheets from said cylinders and at said slow speed when said arms are transferring said sheets to said receiver.

6. In a conveyor for handling sheets of paper moving at a continuous speed from a printing press, the combination comprising a series of rotatable cylinders, said series including a delivery cylinder of a predetermined diameter, a sheet collecting cylinder included in said series and disposed in down-stream sheet-receiving communication with said delivery cylinder and being of a diameter of an even fraction less than said predetermined diameter, a carrier rotatably mounted and disposed in down-stream sheet-receiving communication with said collecting cylinder, sheet grippers respectively attached to said cylinders and said carrier, means operatively associated with said carrier for rotating said carrier at a predetermined peripheral speed when receiving said sheets from said series of cylinders and thereafter rotating said carrier at a slower speed, certain of said series of cylinders and said carrier mounted with the axes of rotation thereof parallel and on a common plane and with said collecting cylinder being offset from said plane to be positioned to receive said sheets from said delivery cylinder at a position more than 180 degrees of rotation of said delivery cylinder from the position that said delivery cylinder received said sheets.

7. In a conveyor for receiving sheets of paper moving at a continuous speed, the combination comprising a series of rotatable cylinders for rotation at a common predetermined peripheral speed corresponding to said continuous speed, said series including a first cylinder and a second cylinder with the latter being a predetermined diameter, a sheet collecting cylinder included in said series to be in sheet receiving communication with said second cylinder and being one-half the diameter of said second cylinder, a transfer cylinder included in said series and in sheet receiving communication with said collecting cylinder and being of the diameter of said second cylinder, a carrier rotatably mounted in sheet receiving communication with said transfer cylinder, sheet grippers respectively attached to said cylinders and to said carrier for progressively transferring said sheets to said carrier upon rotation of said cylinders and said carrier, and means operatively associated with said carrier for rotating said carrier at said predetermined peripheral speed when receiving said sheets from said series of cylinders and thereafter rotating said carrier at a slower speed.

8. In a conveyor for handling flexible sheets such as paper or the like, the combination comprising a series of rotatable cylinders positioned in approximate rolling contact for rotation at a common predetermined peripheral speed, said series including a first cylinder and a second cylinder, a sheet cutting knife and slot combination on the circumference of said first and said second cylinders to cut said sheets into predetermined lengths, a sheet collecting cylinder included in said series and one-half the diameter of said second cylinder and disposed in sheet receiving communication with said second cylinder, a carrier rotatably mounted in sheet receiving communication with said collecting cylinder, two sets of sheet grippers diametrically oppositely attached to the circumference of said second cylinder, a sole set of sheet grippers attached to the circumference of said collecting cylinder for collecting a plurality of said sheets before transferring said plurality to said carrier, a sole set of sheet grippers attached to said carrier, all said grippers respectively disposed and operable for progressively transferring said sheets to said carrier upon rotation of said cylinders and said carrier, and means in driving engagement with said carrier for rotating said grippers of said carrier at said predetermined peripheral speed when receiving said sheets from said series of cylinders and thereafter rotating said grippers of said carrier at a slower speed when said grippers of said carrier release said sheets.

9. In a conveyor for handling flexible sheets such as paper or the like, the combination comprising a series of rotatable cylinders positioned in approximate rolling contact for rotation at a common predetermined peripheral speed, said series including a first cylinder and a second cylinder with the axes thereof on a common plane, a sheet cutting knife and slot combination on the circumference of said first and said second cylinders to cut said sheets into predetermined lengths, a sheet collecting cylinder included in said series and being one half the diameter of said second cylinder and disposed in sheet receiving communication with said second cylinder and with the axis thereof offset from said common plane to the side of the latter in the direction of rotation of said second cylinder at the point adjacent said collecting cylinder, a carrier rotatably mounted in sheet receiving communication with said collecting cylinder, two sets of sheet grippers diametrically oppositely attached to the circumference of said second cylinder, a sole set of sheet grippers attached to the circumference of said collecting cylinder for receiving a sheet from each set of said grippers on said second cylinder with each revolution of said cylinders, a sole set of sheet grippers attached to said carrier, all said grippers respectively disposed and operable for progressively transferring said sheets to said carrier upon rotation of said cylinders and said carrier, and means in driving relation to said carrier for rotating said carrier at said predetermined peripheral speed when receiving said sheets from said series of cylinders and thereafter rotating said carrier at a slower speed when said grippers of said carrier release said sheets.

References Cited in the file of this patent

UNITED STATES PATENTS

| | | |
|---|---|---|
| 1,624,985 | Sheldon | Apr. 19, 1927 |
| 2,110,585 | Barber | Mar. 8, 1938 |
| 2,435,881 | Faeber | Feb. 10, 1948 |
| 2,555,267 | Crafts | May 29, 1951 |
| 2,699,333 | Claybourn | Jan. 11, 1955 |